(12) United States Patent
Oberholtzer

(10) Patent No.: US 7,966,975 B2
(45) Date of Patent: Jun. 28, 2011

(54) GROUND MOUNTED ANIMAL BELLY BRUSH

(76) Inventor: Rahmar Oberholtzer, Citrus Heights, CA (US)

( * ) Notice: Subject to any disclaimer, the term of this patent is extended or adjusted under 35 U.S.C. 154(b) by 296 days.

(21) Appl. No.: 12/250,513

(22) Filed: Oct. 13, 2008

(65) Prior Publication Data
US 2009/0095228 A1    Apr. 16, 2009

Related U.S. Application Data

(60) Provisional application No. 60/998,819, filed on Oct. 12, 2007.

(51) Int. Cl.
*A01K 13/00* (2006.01)
(52) U.S. Cl. .......................... 119/621; 119/664
(58) Field of Classification Search .............. 119/621, 119/601, 600, 612, 651, 652, 656, 786, 787, 119/788, 661, 664; 15/215, 30, 36; D30/154; 135/118
See application file for complete search history.

(56) References Cited

U.S. PATENT DOCUMENTS

| | | | | |
|---|---|---|---|---|
| 56,252 A * | 7/1866 | Newbury | ...................... | 15/161 |
| 605,724 A * | 6/1898 | Lafaurie et al. | ................... | 15/36 |
| 700,069 A * | 5/1902 | Mullen | ............................ | 15/36 |
| 1,760,815 A * | 5/1930 | Cazel | .............................. | 15/112 |
| 3,069,710 A * | 12/1962 | Dremel et al. | .................... | 15/36 |
| 3,783,471 A * | 1/1974 | McGeary et al. | ............... | 15/215 |
| 4,177,763 A * | 12/1979 | Cook | .............................. | 119/706 |
| D255,610 S * | 6/1980 | Clarke-Fodor | .............. | D30/158 |
| 5,176,105 A * | 1/1993 | Madden | ....................... | 119/622 |
| D336,557 S * | 6/1993 | Wade | ........................... | D30/160 |
| 5,345,641 A * | 9/1994 | Webster | ........................ | 15/105 |
| 5,517,945 A * | 5/1996 | Udelle | .......................... | 119/608 |
| 5,630,378 A * | 5/1997 | Multala | ........................ | 119/621 |
| 5,842,440 A * | 12/1998 | Bell, Jr. | ........................ | 119/621 |
| 6,065,431 A * | 5/2000 | Davis | ........................... | 119/600 |
| 6,378,462 B1 * | 4/2002 | Gaves et al. | .................. | 119/621 |
| 6,584,636 B2 * | 7/2003 | Schlem | ....................... | 15/104.92 |
| D540,064 S * | 4/2007 | Barthelmess | ................. | D6/397 |
| 7,444,959 B2 * | 11/2008 | Hensley | ...................... | 119/622 |
| 7,666,483 B2 * | 2/2010 | Barthelmess | .................. | 428/19 |
| 2006/0185615 A1 * | 8/2006 | Gorin | ........................... | 119/600 |
| 2007/0039558 A1 * | 2/2007 | Hensley | ....................... | 119/621 |

* cited by examiner

*Primary Examiner* — Yvonne R. Abbott
(74) *Attorney, Agent, or Firm* — Temmerman Law Office; Mathew J. Temmerman

(57) ABSTRACT

The present invention is a ground-based tool for use by horses, livestock and other animals for such animals to scratch themselves without human intervention. The tool is configured and positioned to remove biting insects from animal undersides and to relieve any itching from such insects or from other causes. In a preferred embodiment the device comprises at least one anchor for securing the device to the ground such that a tuft of bristles extends upwardly to a height to allow an animal to scratch its own belly. The device is flexible yet strong enough to withstand the potentially large forces applied by a large animal standing over the device.

14 Claims, 5 Drawing Sheets

GROUND MOUNTED ANIMAL BELLY BRUSH

RELATED APPLICATIONS

This application is related to previously filed U.S. provisional patent application Ser. No. 60/998,819, filed Oct. 12, 2007, entitled "belly brush", which is incorporated by reference herein as if set out in full. Because the anniversary date of the provisional application falls on a Sunday, the date for timely filing a nonprovisional application is extended to the next business day, in this case because of the Columbus Day Federal Holiday, Oct. 14, 2008. 35 USC §119(e) (3).

BACKGROUND

1. Field of the Invention

The present invention relates to brushes for livestock, and more particularly to ground mounted brushes that may be used by livestock and other animals to scratch their own bellies without the assistance from humans.

2. Background of the Invention

Horses and other livestock normally use a variety of means to relieve themselves of itches and the insects that cause them. For instance, through a simple flick of its own tail a horse can remove insects from much of its body. For other parts of the horse's body, the horse may rub against a fence, tree, bush or the like. The underside and chest of the horse, and indeed the undersides and chest of all large livestock are the most difficult areas for the animals to self-scratch.

Fortunately, most livestock are not without assistance from their keepers, who may provide any combination of products currently available to assist such animals with the discomfort caused by insect bites. Most of these products are chemicals, fly sprays, ointments or ingestible chemicals that secrete tastes offensive to the insects or that kill the insects upon contact. Although these products may work, many animal owners are reluctant to use them out of fear of harm to the animal, harm to the environment, or cost. Even with the use of such products, occasional underside itching may still occur, in which the animal must rely on human intervention, either in the form of physical scratching or the application of topical ointments.

There is thus a need for a tool to allow an animal to self-scratch its underside so it may relieve any discomfort and remove any insects without the assistance of humans.

It is a further object of the invention to provide a flexible but sturdy brush capable of withstanding long-term outdoor use by large animals.

It is a further object of the present invention to provide a tool as described which may be manufactured and sold at low cost and which will simplify the working parts thereof.

DESCRIPTION OF RELATED ART

U.S. Pat. Nos. 4,747,371 4,807,569 and 4,926,796 to Leopold disclose "A toothed plate securable to a wall, corner or other supporting fixture defining an animal grooming device usable by the animal without human intervention. An aperture plate having holes positioned to correspond to the location of the teeth on the toothed plate mesh with the teeth and cover a portion of each tooth for providing added strength to and stiffening of each tooth when closed, a teeth straightening function upon opening and closing the two plates and a teeth cleaning function upon opening of the plates. A container for holding an animal attracting material is provided."

U.S. Pat. No. 3,159,144, to Duncan et al. discloses in insecticide applicator for livestock comprising a post that extends out from the ground and is tethered to the ground with two chainlike applicators that when rubbed against by an animal, apply insecticide to the animal. By comparison to the present device, the disclosure of Duncan is complicated and likely expensive. Additionally, it must be secured to the ground at three locations wherein the present invention is secured to the ground at just one.

U.S. Patent Application 2007/0039558, to Hensley, discloses an animal self-grooming system incorporating a platform supporting horizontally and vertically oriented brushes or combs which is usable by an animal without human intervention. The brushes or combs are positioned such that they support walk-by and stationary self-grooming respectively as well as massage. This device is for small animals and its rigidness would make it unsuitable for the forces applied by large animals and possibly dangerous to said animals.

The prior art revealed other devices that enable an animal to easily rub its back or side against an abrasive surface, however, no prior art was located to allow an animal to scratch its belly. This is perhaps because such devices that allow an animal to scratch its back or sides are generally only subjected to forces supplied by the animal and at the animal's discretion. Devices for scratching the undersides of the animal are potentially exposed to much greater forces due to the effect gravity has on the animals using the device. That is, simply reconfiguring the prior art to provide a means for a large animal to scratch its underside could fail or potentially injure the animal due to forces beyond the animal's control, i.e. gravity. There is thus a need for a device that serves to allow a large animal to scratch its own underside, yet remain safe for the animal and defensible against large forces unintentionally caused by the force of gravity on the animal.

SUMMARY OF THE INVENTION

The present invention is a ground-based tool for use by horses, livestock and other animals for such animals to scratch themselves without human intervention. The tool is configured and positioned to remove biting insects from animal undersides and to relieve any itching from such insects or from other causes. In a preferred embodiment the device comprises at least one anchor for securing the device to the ground such that a tuft of bristles extends upwards at a height to allow an animal to scratch its own belly. The device is flexible yet strong enough to withstand the potentially large forces applied by a large animal standing over the device.

BRIEF DESCRIPTION OF THE DRAWINGS

The foregoing aspects and many of the attendant advantages of the invention will become more readily appreciated as the same becomes better understood by reference to the following detailed description, when taken in conjunction with the accompanying drawings, wherein.

DETAILED DESCRIPTION OF THE INVENTION

The following description is presented to enable a person of ordinary skill in the art to make and use various aspects and examples of the present invention. Descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described and shown, but is to be accorded the scope consistent with the appended claims.

The present invention is a ground-based tool for use by horses and other livestock for such animals to remove biting insects from their undersides and to relieve any itching from such insects or from other causes. In a preferred embodiment the device comprises at least one anchor for securing the device to the ground such that a tuft of bristles extends upwards at a height to allow an animal to scratch its own belly. The device is flexible yet strong enough to withstand the potentially large forces applied by a large animal standing over the device.

Figure 1:
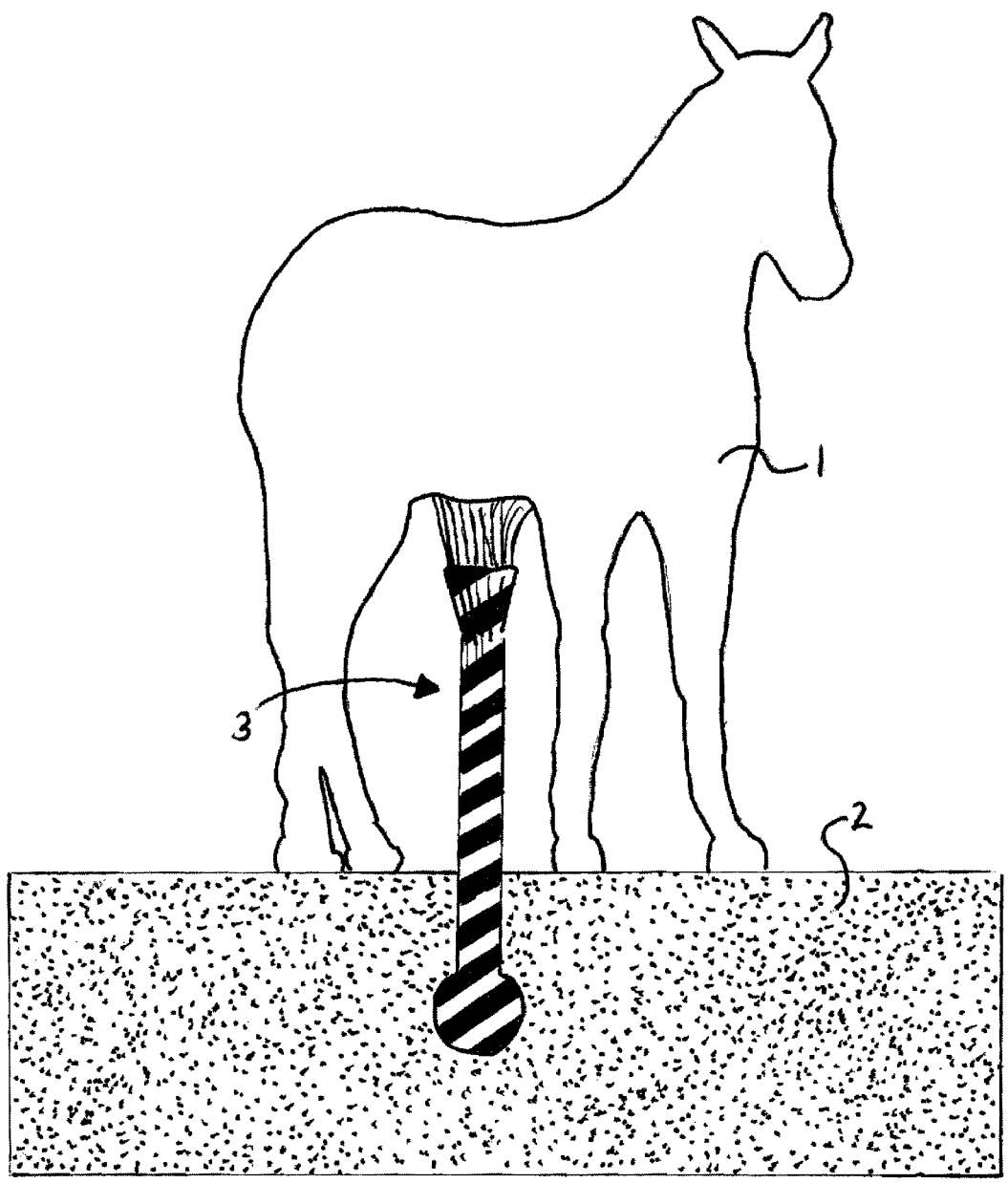
FIG. 1 depicts a diagrammatic view of the present invention.
Figure 2:
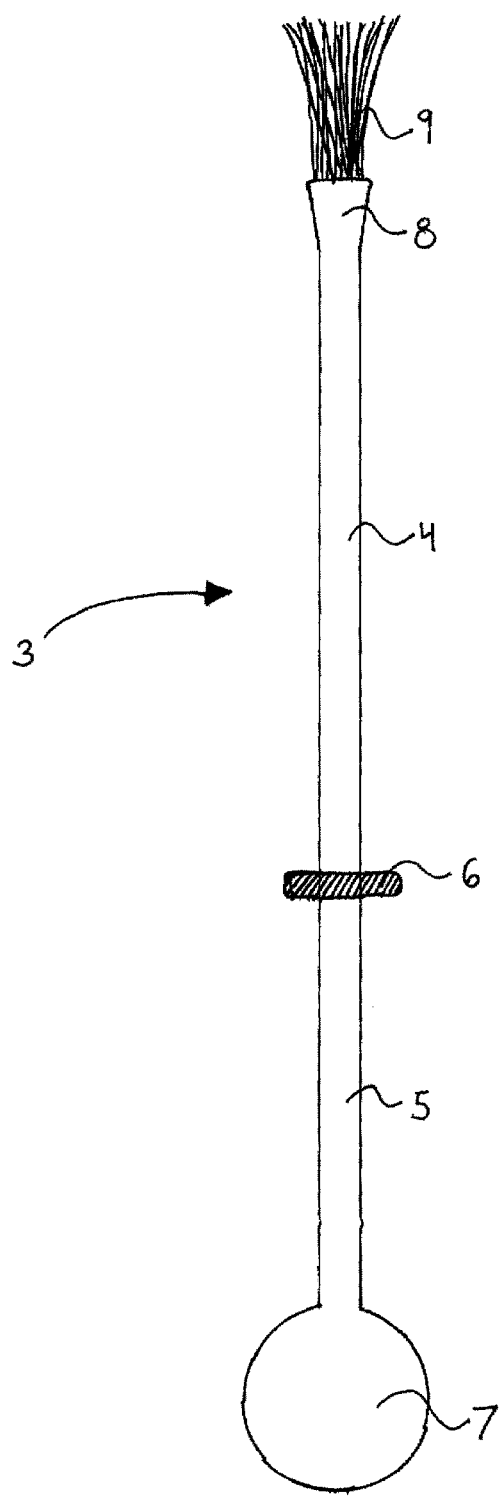
FIG. 2 depicts a side planar view of a preferred embodiment of the present invention.

FIG. 1 is a diagrammatic depiction of the device in use. FIG. 2 shows a preferred embodiment of the ground-mounted animal belly brush. In an exemplary embodiment, the tool comprises a first anchor, a second anchor, a flexible shaft, and a brush. Turning now to FIG. 2, preferably the first anchor comprises a round bulb 7 as shown. While in a preferred embodiment the bulb is approximately 3 inches in diameter, other sizes and indeed other anchors may be employed without detracting from the invention. The elongated member is generally stated a flexible shaft comprising a shaft upper portion 4 and a shaft lower portion 5. Between upper portion 4 and lower portion 5 is a second anchor that in a preferred embodiment comprises a ring 6. Although labeled with separate reference numbers, upper portion 4 and lower portion 5 are preferably one continuous piece of material, with the individual demarcations being for ease of understanding only. Such a configuration allows the device to be of simple and low-cost construction. At the end of the device distal from the bulb is a flared tip 8 comprising a brush 9.

Bulb 7 and ring 6 may in a preferred embodiment be fashioned from the same piece of material from which the shaft is fashioned. In alternative embodiments of the invention other anchors may be used that are attached by adhesive or any other desirable means for attaching, such as nuts, bolts, screws, rivets, welds or the like.

The flexible shaft described above preferably comprises an elongated strip of rubber. However, any flexible material such as aluminum, silicone, flexible plastic, or the like may be used for the elongated member so long as such material will bend or flex allowing the portion of the member that extends out of the ground (generally upper portion 4) to oscillate slightly when disturbed by an animal. See FIG. 1. The elongated member is approximately 60 inches long, two inches wide and varying in thickness from 3/8 of an inch thick to 1/2 an inch thick. The thickness in one embodiment tapers gradually from a maximum size adjacent to bulb 7 to a minimum size adjacent to flared tip 8. This size is exemplary only and it is important to note that the material and dimensions of the elongated member may depart from the preferred embodiment described above.

Brush 9 comprises a group of mixed plastic filaments or bristles. The bristles are stiff enough to stand upright but flexible enough to bend when force is applied by an animal's underside. Various means exist in the prior art for constructing sturdy brushes, but the preferred means including folding a bundle of bristles into a ∪ and molding the top of the upper member directly to the bottom of the ∪ shape of bristles.

In use, the shaft extends outwards from the ground as shown in diagrammatic FIG. 1. Here, the anchor portion is depicted buried in the ground, and the flexible shaft is depicted rising from the ground.

The tool is adjustable in that for proper use the tool is first buried by the animal's keeper in the ground at a depth relevant to the animals living near it. For instance, in a goat pen the device is buried much deeper and thus extends out of the ground much less distance that it would extend in a horse pen, where the animals are taller. To accommodate the underside of an animal that is 36 inches off the ground in the exemplary embodiment described (wherein the shaft is approximately 60 inches in length), the bulb would be buried at a depth of 24 inches. The bristles extend upwards beyond the height of the distal end of the shaft and as described are flexible enough to provide some resistance without breaking as the animal brushes against them.

The tool is preferably made available to the animal through a semi-permanent installation in the animal's living environment. In the environment, the tool stands ready for use at the will of the animal, which when having the desire to scratch its underside, will move to a position over the tool and scratch or drag its body against it so as the relieve any discomfort. The Applicant has tested the device and recorded success in live stock quickly understanding the nature of the device and utilizing it to scratch their own bellies, as shown by horse 1.

In an alternative embodiment, the bulb described above is a multi-spiked anchor (not shown). The spike structure secures the tool to the ground in a fashion similar to the bulb structure. Similarly, the ring can be replaced with other structures for rigidly connecting the device with the earth. In yet an additional alternative embodiment of the invention, the elongated member does not comprise a single piece of material but instead comprises two different materials of differing flexibility. For instance, lower portion 5 may comprise a more rigid material to ensure the device stays anchored in the earth while upper portion 4 may comprise a more flexible material so as to ensure the safety of the animal. In another alternative embodiment of the invention a ferrule 31 is described near the flared tip 8 of the device to strengthening the device and preventing it from wearing.

Figure 3:
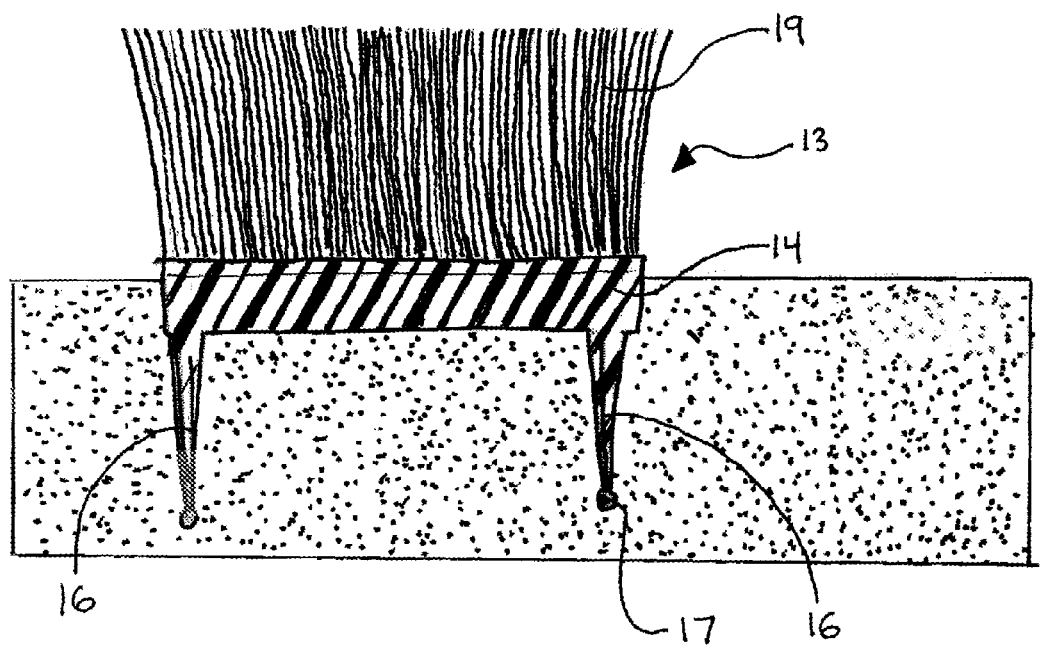
FIG. 3 depicts a cross sectional view of an alternative embodiment of the present invention.
Figure 4:
FIG. 4 depicts a top planar view of the alternative embodiment of the present invention depicted in FIG. 3.

FIG. 3 shows another embodiment of the belly brush 13 having a longer flatter base with at least two spikes 16 driven or buried into the earth for support, and wherein the brush is set up as in in-line structure for animals that may prefer to walk through a brush rather than rub against it. In FIG. 3, the base 14 is again shown comprising rubber, although as above other suitable materials may be used. For stability an anchor 17 is again employed at the end of spikes 16. In the embodiment shown, the anchor 17 again comprises a bulb like structure. Brush 19 extends generally vertically from base 14, and because the bristles of the brush (not individually labeled) must extend further in this embodiment, they are preferably made of a more rigid material than in the preferred embodiment. FIG. 4 again shows brush 19 from a planar top view, wherein the long but slender shape of the alternative embodiment is apparent.

Figure 5:
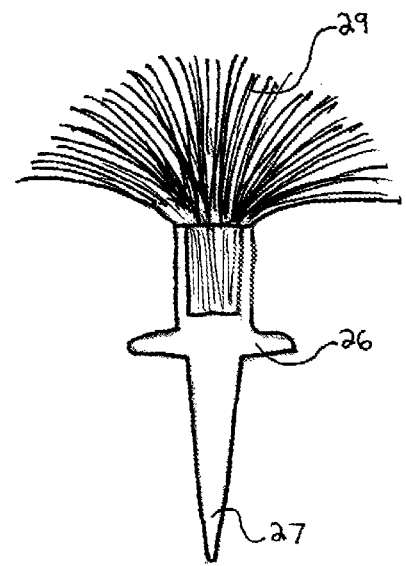
FIG. 5 depicts a cross sectional view of a second alternative embodiment of the present invention.
Figure 6:
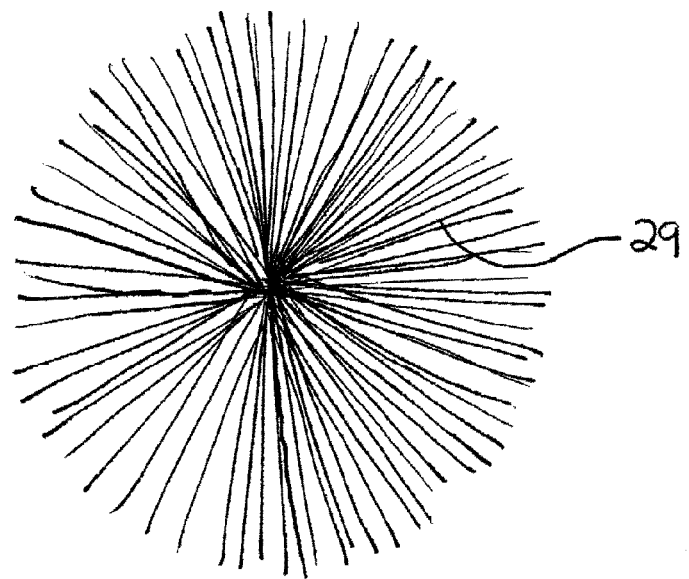
FIG. 6 depicts a top planar view of the second embodiment of the present invention depicted in FIG. 5.

In yet an additional alternative embodiment, shown in FIGS. 5 and 6, a small rounded belly brush is depicted. This device is an alternative for animals with bellies relatively close to the ground, such as pigs. Here, the brush portion is labeled as reference number 29 and as more evident from the top planar view shown in FIG. 6, the brush flays radially outwards in substantially all directions. The brush is bound to base 27, which again comprises an anchor 26 for stability when the device is partially buried in the ground.

Figure 7:
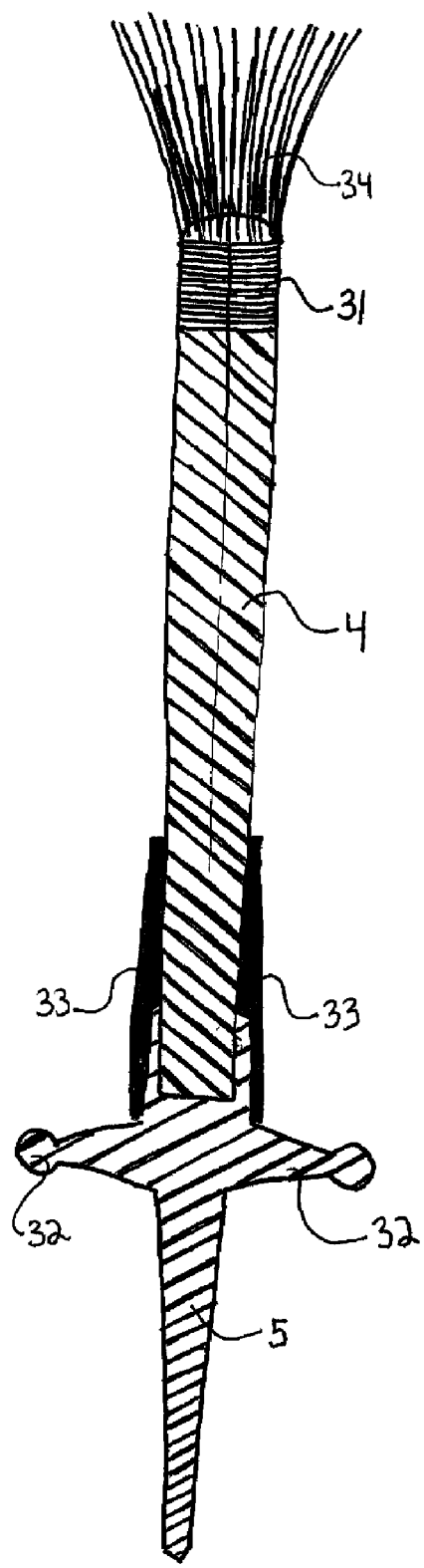
FIG. 7 depicts a side planar view of a third embodiment of the present invention.

FIG. 7 depicts an alternative embodiment of the invention comprising several of the above alternative elements. As noted above, a ferrule 31 is positioned to bind the bristles to upper member 4. Furthermore, in this alternative embodiment upper member 4 and lower member 5 are not one continuous piece of material. FIG. 7 depicts them as separate materials, and as described above in an exemplary case the material making up lower member 5 is a more rigid material than the material making up upper member 4. FIG. 7 also depicts an anchor 32 comprising two bulbs and ribbing 33 for further supporting upper member 4. In practice, the entire lower member 5 and at least a portion of upper member 4 is buried in the ground by the installer of the system. Depending on the height of the animal, varying levels of ribbing 33 may be buried such that bristles 34 are at a height permitting the animal using the device to scratch itself without human intervention. Similarly, the device may be made of sizes suitable for larger animals such as Rhinoceroses, Elephants, and Zebras. There and other zoo animals could utilize the device similarly to that described for livestock.

With respect to the above description then, it is to be realized that material disclosed in the applicant's drawings and description may be modified in certain ways while still producing the same result claimed by the applicant. Such variations are deemed readily apparent and obvious to one skilled in the art, and all equivalent relationships to those illustrated in the drawings and equations and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact disclosure shown and described, and accordingly, all suitable modifications and equivalents may be resorted to, falling within the scope of the invention.

I claim:

1. A tool mounted in the earth for scratching the belly of an animal without human intervention, the tool comprising:
   a. an elongated member including a first end configured to be inserted completely in the earth and a flexible second end comprising a tuft of bristles, said flexible second end extending vertically from the ground; and
   b. at least one anchor for securing said first end into the ground.

2. The tool of claim 1 wherein said elongated member is generally flat, having two substantially parallel wide planar faces.

3. The tool of claim 2 wherein said anchor is bulb shaped.

4. A method of providing a brush system for use by animal to scratch its own belly without human intervention, the method comprising the steps of:
   a. providing an elongated member further comprising a first end and a flexible second end, said first end comprising an anchor and said second end further comprising a brush; and
   b. burying said first end in the ground such that said second end extends substantially vertically from the ground and such that said brush faces upwards for use by animal to scratch its own belly without human intervention.

5. The method of claim 4 wherein said anchor is bulb shaped.

6. The method of claim 4 wherein said brush further comprises an upwardly facing tuft of bristles.

7. The method of claim 6 where said elongated member is generally flat, having two substantially parallel wide planar faces, and wherein said elongated member oscillates perpendicularly to said planar faces while in use by said animal.

8. The method of claim 7 wherein said second end oscillates between substantially straight and substantially arc-shaped configurations.

9. The method of claim 8 wherein said first end comprises support ribbing.

10. A method for providing a scratching tool for use by animal to scratch itself without human intervention, the method comprising the steps of:
    a. providing an elongated member comprising a first end and a flexible second end, wherein said first end further comprises at least one anchor and said second end further comprises an upwardly facing brush; and
    b. partially burying said elongated member in the earth such that said anchor is buried and said second end extends substantially vertically from the earth, thereby positioning said upwardly facing brush at a height approximately equal to a belly of an animal.

11. The method of claim 10 wherein said brush further comprises an upwardly facing tuft of bristles.

12. The tool described in claim 10 wherein said elongated member is generally flat, having two substantially parallel wide planar faces, and wherein said elongated member oscillates perpendicularly to said planar faces while in use by said animal.

13. The method of claim 12 wherein said second end oscillates between substantially straight and substantially arc-shaped configurations.

14. The method of claim 13 wherein said first end comprises support ribbing.

* * * * *